June 4, 1929.                    B. BART                    1,716,350
                               GLASS MOLD
                            Filed Nov. 10, 1923
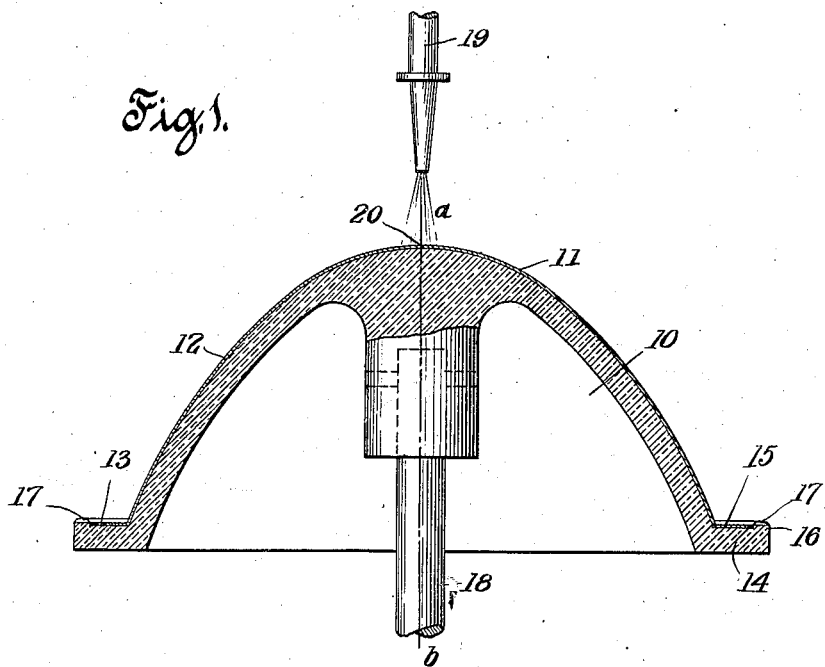
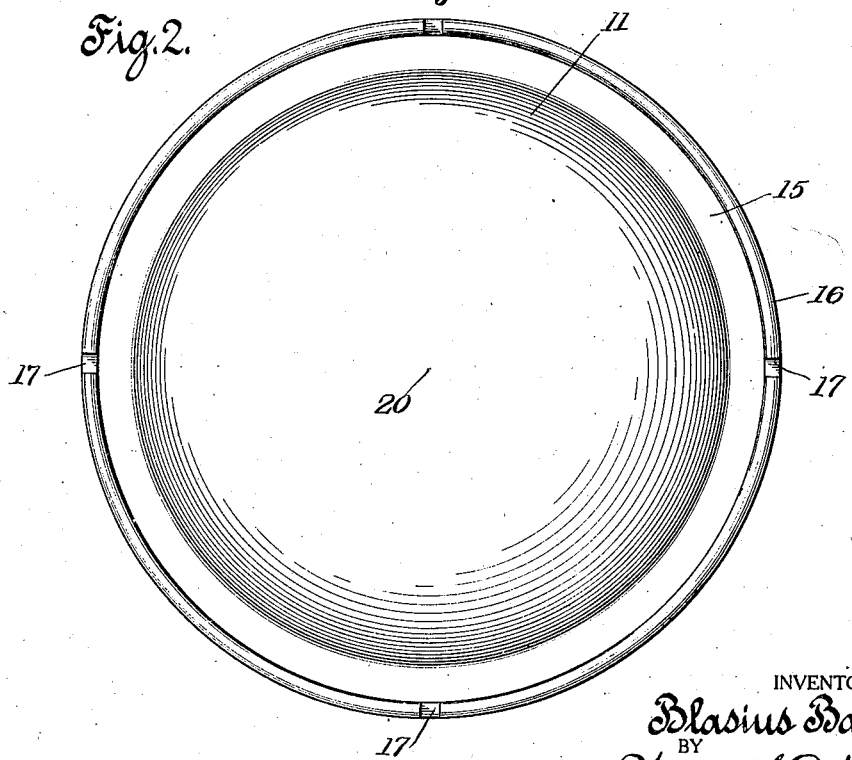
INVENTOR
Blasius Bart
BY
Warren S. Orton
ATTORNEY Patented June 4, 1929.

1,716,350

UNITED STATES PATENT OFFICE.

BLASIUS BART, OF EAST ORANGE, NEW JERSEY, ASSIGNOR TO BART REFLECTOR CO. INC., OF NEWARK, NEW JERSEY, A CORPORATION OF DELAWARE.

GLASS MOLD.

Original application filed January 11, 1923, Serial No. 612,132. Divided and this application filed November 10, 1923. Serial No. 673,977.

The invention relates to a glass mold constituting a part of apparatus used in forming thin metallic shells of the type employed as reflectors in which case this application constitutes a division of application, Serial No. 612,132, filed January 11, 1923.

In my copending application on molds for reflectors, Serial No. 502,679, filed September 3, 1921, the backing to a parabolic reflector was there shown as formed with an outstanding flange shaped on a ground ring which was formed separate from the curved portion of the glass mold usually employed in such operations. In this prior disclosure no attempt was made to form the silver coating on the flange portion of the mold due to the difficulty of preventing cracking or separating of the thin silver deposit when an attempt was made to position the silver coated mold in the electrolytic tank. In my copending application, Serial No. 612,133, filed January 11, 1923, method of grinding glass molds, there is disclosed a method for forming a glass mold provided with an integral outstanding flange. These flanged glass molds have not been possible to construct heretofore due to the fact that it has not been possible to grind a parabolic mold when provided with an outstanding flange. The present disclosure features the formation of a metallic reflector, the reflecting surface of which can be formed on such a mold and in this way provide a parabolic, or similar reflector, different from prior similar constructions in that it includes an integrally formed outstanding flange.

The primary object of the invention herein disclosed is to provide a simple form of glass or similar mold by means of which reflectors, grinding tools and other metallic shells of the above types disclosed in the above identified applications may be formed.

In the commercial production of certain metallic articles, such, for instance, as parabolic reflectors provided with outstanding flanges, there is a serious objection to the formation of a structure which necessitates any retrimming or cutting off of free edges. Further it is required that these flanges, which are utilized as part of the mounting means of the reflector, be formed accurately with relation to the optic axis or other point of reference of the reflector.

Accordingly, another object of the present disclosure is to provide a form of mold and a method of depositing metal on a mold so that it will act to form exactly the desired configuration and dimensions of the curved or parabolic portion of the reflector, as well as its associated outstanding flange and which will insure the definite locating of the flange with reference to the curved portion of the reflecting surface.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the drawings:—

Figure 1 is a view in axial section, illustrating a glass mold constituting a physical embodiment of the invention shown in position as part of an apparatus used in forming a flanged reflector by chemical deposition; and Figure 2 is a plan view of the mold shown in Figure 1.

There is shown a master mold 10, the central portion of which is convexed with a forming surface 11, symmetrically disposed with reference to an axis of rotation indicated by the line a—b. In the device illustrated the mold is intended to define the reflecting surface of a parabolic reflector indicated at 12 and provided with an outstanding flange 13. The flange 13 of the reflector is formed on the top of an outstanding flange 14, which projects integrally from the curved portion of the glass mold. The top surface 15 of the flange 14 is contained in a plan normal to the line a—b, that is, at right angles to the optic axis of the reflector. The flange 14 is outlined by an upstanding rim 16, which rim is provided with a plurality of over-flow recesses 17.

The glass mold is mounted for rotary movement about the axis a—b and for this purpose is operatively connected to a power shaft 18. A spray of metal capable of forming a reflecting surface is directed on to the surface of the mold from a depositing apparatus indicated cymbolically by the spray nozzle 10. The glass mold herein disclosed may be used to receive a deposit of metal by electrolytic precipitation as more fully disclosed in application, Serial No. 612,133.

The overflow recesses formed in the rib provide convenient means for securing the contacts. Preferably the mold is not highly polished in the recesses 17 but is matted so as to provide a relatively rough surface. The effect is that the reduced silver solution tends to accumulate at the recesses and in this way there is formed an electric connection between the shell and the contacts which connection is of relatively great cross section and therefore of improved conductivity. In this way a positive electric connection is provided between the several contacts and the extensive area of the silver faced flange. The portion of the glass rim between the recesses provides insulators between the contacts.

When the proper thickness of electrolytically deposited backing has formed, the metallic shell is readily removed from the glass mold by subjecting the same to a heat treatment. This is most conveniently attained by spraying hot water on the back of the shell which is sufficient to expand the shell and thus readily separate the shell from the glass mold.

Usually, it will be necessary to trim the resulting shell at the points which fitted in the recesses, but this will be immaterial as it is not extensive.

Having thus described my invention, I claim:

1. A mold having a convex central portion, an outstanding flange projecting horizontally from the perimeter of the convex portion and an upstanding rim outlining the flange, said rim provided with an overflow recess.

2. A one-piece ground glass mold having a central portion substantially parabolic in cross-section and provided with an outlining flange having a recessed rim.

3. A glass mold having a body portion, an outstanding flange provided with a rim having circumferentially spaced apart recesses.

4. A glass mold having a body portion and an outstanding flange, said flange provided with a rim having an overflow recess and the portion forming the recess being matted.

Signed at New York city, in the county of New York, and State of New York, this 31st day of October A. D. 1923.

BLASIUS BART.